Nov. 20, 1928. 1,691,970

J. C. HAGGART, JR

PROPELLER SHAFT BRAKE MECHANISM

Filed Sept. 26, 1923 2 Sheets-Sheet 1

Inventor
John C. Haggart Jr.

Attorneys

Nov. 20, 1928.

J. C. HAGGART, JR 1,691,970

PROPELLER SHAFT BRAKE MECHANISM

Filed Sept. 26, 1923   2 Sheets-Sheet 2

Inventor
John C. Haggart Jr,
By
Attorneys

Patented Nov. 20, 1928.

1,691,970

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

PROPELLER-SHAFT-BRAKE MECHANISM.

Application filed September 26, 1923. Serial No. 664,879.

Various types of motor vehicles, particularly trucks, have brakes applied to some revolving part or body, other than vehicle wheels or brake drums associated therewith. For instance, the brake mechanism is associated with a propeller shaft and brake shoes applied exteriorly of a brake drum in contradistinction to an interior arrangement of brake shoes, such as disclosed in my companion application filed under even date.

This invention involves a novel and compact brake mechanism for service and emergency brakes of a truck, the mechanism being supported adjacent the universal coupling of a propeller shaft so that the service brake may function in connection with the propeller shaft and the emergency brake mechanism function at the wheels of a vehicle equipped with my brake mechanism. The subject matter of this application may be considered as relating particularly to a service brake, compared to a brake mechanism, such as disclosed in my companion application, which may be considered an emergency brake, although adapted for general braking purposes.

This invention is particularly characterized by an exterior arrangement of fulcrumed shoes relative to a brake drum mounted about a propeller shaft and the arrangement is such that the brake shoes may be simultaneously actuated to bring pressure to bear at diametrically opposed points, relative to the propeller shaft, so as to insure a uniform application of the brakes without setting up stresses and strains which would have a tendency to displace the propeller shaft, parts of the braking mechanism, and cause unnecessary wear and tear on bearings and other parts of a vehicle.

My invention is further characterized by a novel propeller shaft bearing which also serves as a bearing for emergency brake rock shafts, the bearing affording supporting means for service brake shoes, and the complete assembly is such that easy access may be had to each and every part and the brake mechanism readily installed in the chassis of a motor vehicle.

Other advantages gained by my invention will appear as the construction of the brake mechanism is described by aid of the drawing, wherein Figure 1 is a perspective view of a brake mechanism;

Figure 1:
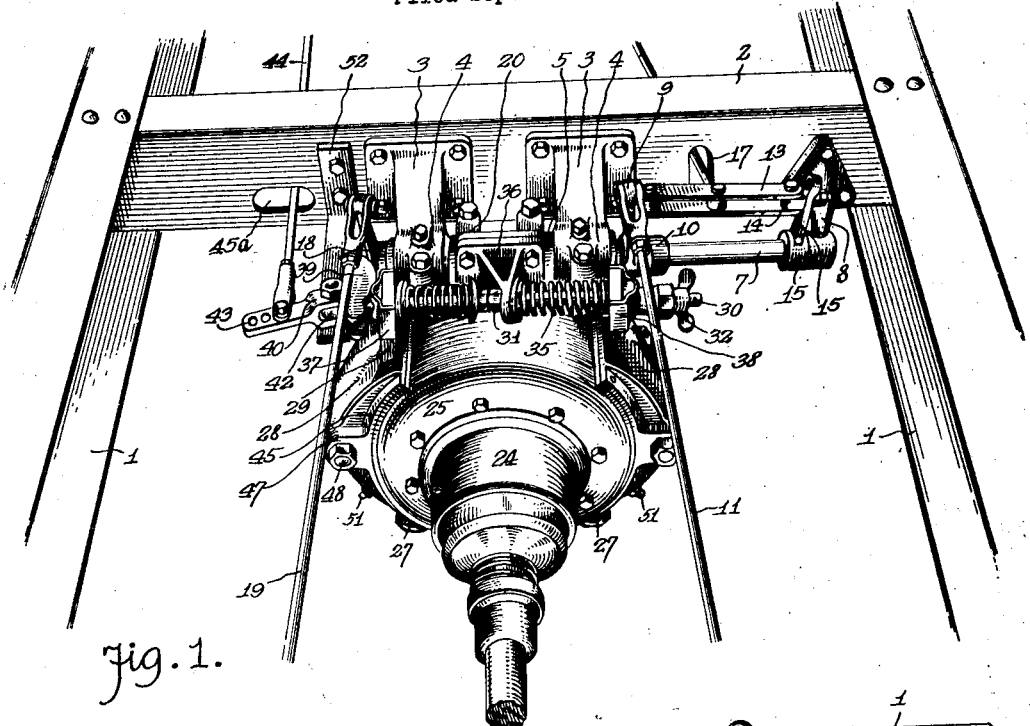

The reference numeral 1 denotes side frames of a truck chassis connected by a transverse member 2 and attached to the transverse member 2 are brackets 3 having sleeve clamping portions 4 in which is fixed a tubular support 5 having end bearings 6 for a rock shaft 7, said rock shaft having one end thereof journaled in another bracket 8 carried by the member 2.

9 denotes a crank loose on the rock shaft 7 at the side of one of the brackets 3, said crank being held against longitudinal displacement by a collar 10 fixed on the rock shaft. The outer end of the crank 9 is operatively connected to an emergency brake rod 11 and adjacent the outer end of said crank is a connection 12 for an equalizing member 13 attached to a connection 14 of another crank 15 fixed on the rock shaft 7, adjacent the bracket 8. Pivotally connected to the equalizing member 13, intermediate the ends thereof, is an operating rod 16 extending through an opening 17 in the transverse member 2 and adapted to extend to the dash, cab or operator's seat of the truck so that it may be actuated to apply the emergency brakes.

18 denotes another crank mounted on the opposite end of the rock shaft 7 from the crank 15 and the upper end of the crank 18 is operatively connected to another emergency brake rod 19, the rods 19 and 11 being best shown in Fig. 1.

20 denotes a sleeve clamping portion of a hanger 21, said sleeve clamping portion being fixed on the tubular support 5 between the brackets 3. The hanger 21 is provided with an antifrictional bearing 22 for a propeller shaft 23 coupled to a universal joint 24, said universal joint being of a conventional form such as employed for connecting drive and driven shafts which do not at all times remain in alinement.

25 denotes a brake drum attached to that member of the universal joint 24 which rotates with the propeller shaft 23 and said brake drum incloses a portion of the hanger 21, thus permitting of the brake controlling mechanism being compactly assembled in proximity to the universal joint 24. A portion of the hanger 21 is bifurcated or forked and shaped to extend out of a brake drum 25 and under said brake drum to afford bearings 26 for pivot pins 27.

Figure 2:
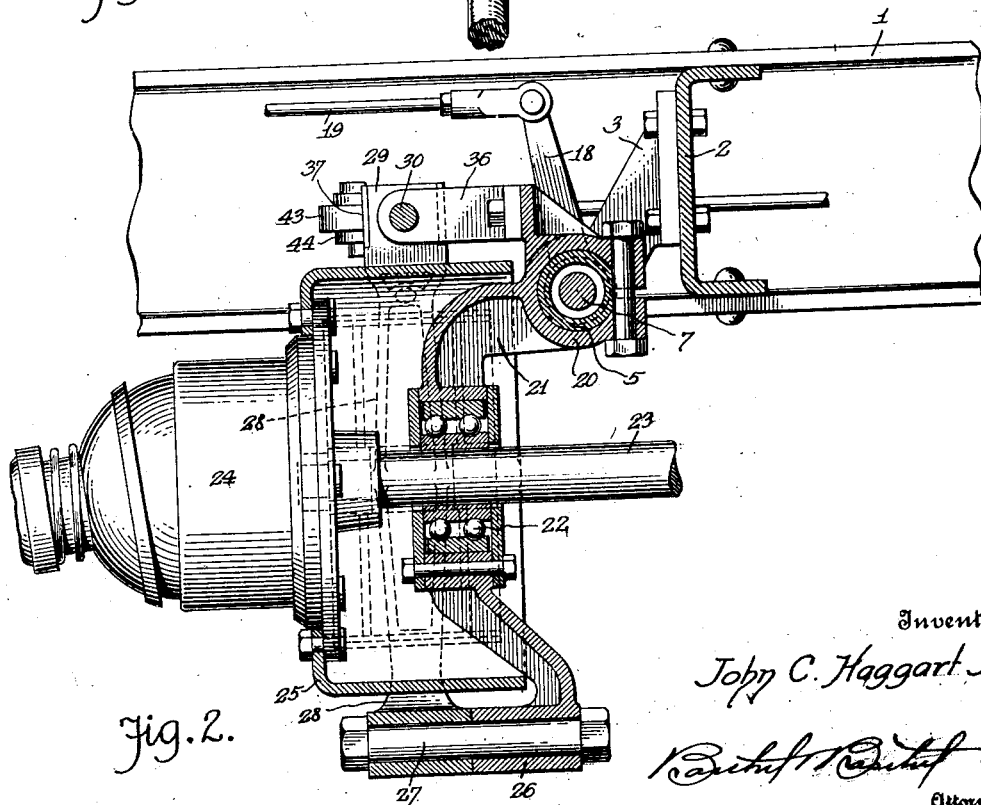
Fig. 2 is a longitudinal sectional view of the same.
Figure 3:
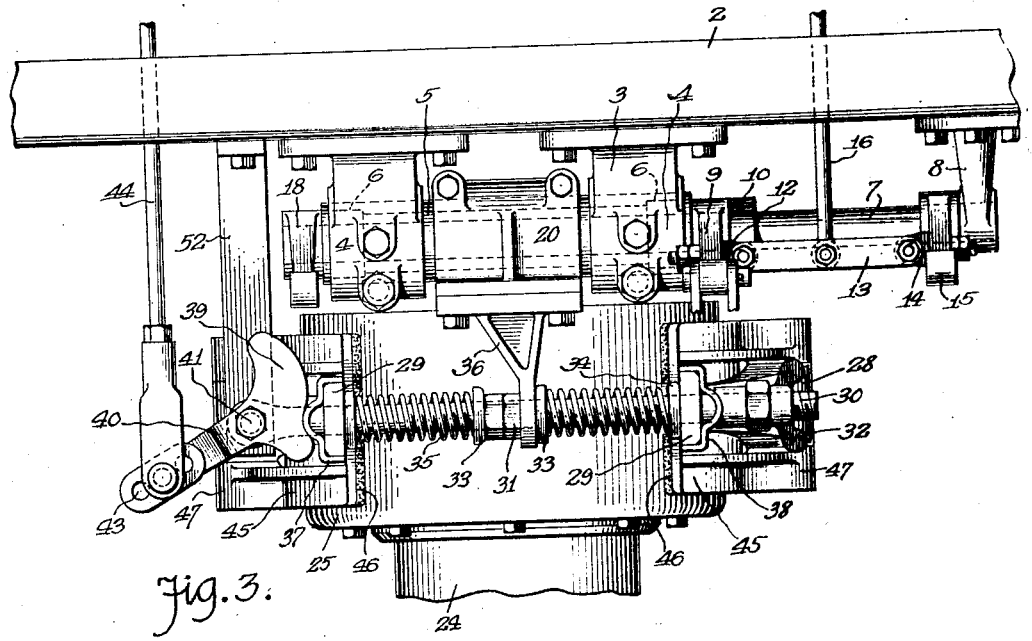
Fig. 3 is a plan of the brake mechanism.

28 denotes arcuated shoe supports exteriorly of the brake drum 25, said shoe supports having the lower ends thereof pivotally mounted on the pins 27. The upper ends 29 of the shoe supports are apertured and loosely extending through the ends 29 of said shoe supports is a transversely disposed rod 30 having screw threads for take-up nuts 31 and 32. Associated with the take-up nuts 31 are spring retainers 33 cooperating with other spring retainers 34 in supporting the end convolutions of coiled springs 35 encircling the rod 30, which extends through a bracket 36 attached to the sleeve clamping portion 20 of the hanger 21, said bracket overhanging the brake drum 25, as best shown in Figs. 2 and 3. The rod 30 loosely extends through the braket 36 and one of the springs 35 is at each side of the braket with the take-up nuts 31 arranged so that the tension of one of said springs may be adjusted to equal the tension of the other spring.

37 and 38 denote wear members embracing the upper ends 29 of the shoe supports 28. The wear member 38 is held in place by the nut 32 on one end of the rod 30, and the wear member 37 is held in place by a cam 39 on the end of a horizontally disposed crank 40 pivotally connected, as at 41, to the head 42 of the rod 30. The outer end of the crank 40 has a series of apertures 43 and operatively connected to the apertured outer end of said crank is a service brake rod 44 extending through an opening 45$^a$ in the transverse member 2. The service brake rod 44 is adapted to extend to the dash, cab or operator's seat of the truck so that it may be conveniently actuated to apply the service brake.

Figure 4:
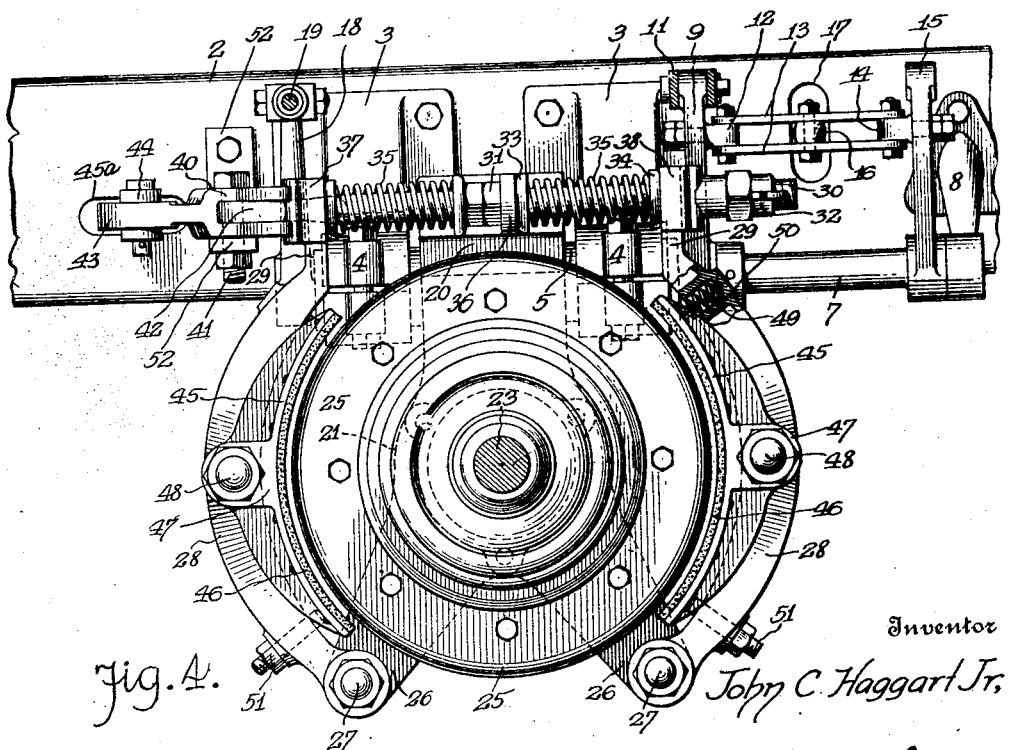
Fig. 4 is an end view of the brake mechanism.

45 denotes brake shoes having liners 46 adapted to engage the periphery of the brake drum 25. The shoes 45 have reinforced apertured ears 47 fulcrumed on pins 48 carried by the shoe supports 28, and by reference to Fig. 4 it will be noted that the pivot pins 48 are in the same horizontal plane as the propeller shaft 23 and that the shoes 45 are diametrically opposed and are adapted to engage equal portions of the brake drum 25. Since the shoes are fulcrumed intermediate the ends thereof said shoes may have an equalizing or self-adjusting action relative to the periphery of the brake drum 25. Furthermore, the location of the brake shoes is such as to avoid torsional stresses and strains which would have a tendency to displace the propeller shaft 23, at least, subject the bearings of said shaft to considerable wear.

49 denotes expansion springs located in pockets 50 adjacent the upper ends of the shoe supports 28, and the lower ends of said shoe supports have adjustable stops or abutments 51 adapted to cooperate with the springs 49 in holding the shoes 45 uniformly relative to the supports 28, for instance, to prevent rattling of the shoes against the supports and also prevent ends of the shoes from dragging on the brake drum 25 when in released positions.

Actuation of the service brake rod 44 causes the rod 30 and one of the shoe supports 28 to be shifted in an opposite direction from the other shoe support, both shoe supports moving towards the brake drum 25 to apply the brake shoes 45. It is by virtue of the cam 39 that the service brake can be gradually applied and just as gradually released.

Since it is good practice to provide a bearing for the propeller shaft, adjacent the universal joint 24, and necessary to provide bearings for the emergency brake rock shafts 7, I have found that the emergency brake mechanism can be conveniently associated with the service brake mechanism whereby the supporting means of the emergency brake mechanism may be utilized for supporting the bearing for the propeller shaft and the greater part of the service brake mechanism with the exception of a bracket 52, carried by the transverse member 2 for the cam crank 40 forming part of the service brake mechanism. With all of the brake mechanism compactly assembled at the transverse member 2, it is an assembly that can be easily placed in position relative to the propeller shaft and the brake drum, and this is accomplished without interfering with any other devices supported in or by the chassis of the truck.

It is to be understood that the structural elements entering into my invention are susceptible to such changes as are permissible by the appended claim.

What I claim is:—

In a brake mechanism, the combination with a propeller shaft, a brake drum rotatable with said shaft, of brackets adjacent said brake drum, a tubular support in said brackets, an operating rock shaft passing through said support, a hanger on said tubular support extending into said brake drum and assisting in supporting said propeller shaft, said hanger having a portion thereof extending out of said brake drum and thereunder, shoe supports attached to that portion of said hanger under said brake drum, shoes pivotally connected to said supports and engageable with said brake drum, and means supported from said hanger above said brake drum for adjusting said shoe supports.

In testimony whereof I affix my signature.

JOHN C. HAGGART, JR.